US008015051B2

(12) United States Patent
Chen et al.

(10) Patent No.: US 8,015,051 B2
(45) Date of Patent: Sep. 6, 2011

(54) SYSTEM AND METHOD FOR BUSINESS PROCESS INTEGRATION

(75) Inventors: Shuyuan Chen, Palo Alto, CA (US); Kaj Van De Loo, San Francisco, CA (US)

(73) Assignee: SAP AG, Walldorf (DE)

( * ) Notice: Subject to any disclaimer, the term of this patent is extended or adjusted under 35 U.S.C. 154(b) by 1085 days.

(21) Appl. No.: 11/151,516

(22) Filed: Jun. 14, 2005

(65) Prior Publication Data

US 2006/0206348 A1 Sep. 14, 2006

Related U.S. Application Data (60) Provisional application No. 60/660,337, filed on Mar. 11, 2005.

(51) Int. Cl.
  *G06Q 10/00* (2006.01)
(52) U.S. Cl. ............. 705/7.23; 705/7.26; 705/7.36
(58) Field of Classification Search ........... 705/7–12, 705/7.23, 7.26, 7.36
  See application file for complete search history.

(56) References Cited

U.S. PATENT DOCUMENTS

| | | | | | |
|---|---|---|---|---|---|
| 5,734,837 | A | * | 3/1998 | Flores et al. | 705/7 |
| 5,826,260 | A | * | 10/1998 | Byrd et al. | 707/5 |
| 6,055,542 | A | * | 4/2000 | Nielsen et al. | 707/104.1 |
| 6,073,109 | A | * | 6/2000 | Flores et al. | 705/8 |
| 6,182,065 | B1 | * | 1/2001 | Yeomans | 707/3 |
| 6,397,228 | B1 | * | 5/2002 | Lamburt et al. | 707/203 |
| 6,631,354 | B1 | * | 10/2003 | Leymann et al. | 705/8 |
| 7,039,594 | B1 | * | 5/2006 | Gersting | 705/7 |
| 7,730,446 | B2 | * | 6/2010 | Anonsen et al. | 717/104 |
| 2002/0116176 | A1 | * | 8/2002 | Tsourikov et al. | 704/9 |
| 2003/0160815 | A1 | * | 8/2003 | Muschetto | 345/733 |
| 2004/0162816 | A1 | * | 8/2004 | Irle et al. | 707/3 |
| 2004/0236843 | A1 | * | 11/2004 | Wing et al. | 709/219 |
| 2005/0065773 | A1 | * | 3/2005 | Huang et al. | 704/7 |
| 2005/0210256 | A1 | * | 9/2005 | Meier et al. | 713/176 |
| 2006/0041423 | A1 | * | 2/2006 | Kline et al. | 704/9 |
| 2006/0129974 | A1 | * | 6/2006 | Brendle et al. | 717/108 |
| 2006/0179036 | A1 | * | 8/2006 | Broker | 707/3 |
| 2006/0225032 | A1 | * | 10/2006 | Klerk et al. | 717/105 |
| 2007/0150330 | A1 | * | 6/2007 | McGoveran | 705/8 |
| 2007/0180066 | A1 | * | 8/2007 | Sherwood et al. | 709/220 |

OTHER PUBLICATIONS

"Mozilla Firefox 4".pdf, dated 2004 and accessed via the Internet Archive on Jun. 8, 2010.*

\* cited by examiner

*Primary Examiner* — Beth V. Boswell
*Assistant Examiner* — Adrian McPhillip
(74) *Attorney, Agent, or Firm* — Kenyon & Kenyon LLP (57) ABSTRACT

Embodiments of the present invention relate to an automated way for a non-technical person to create or modify software functionality in support of a business process without needing expertise in software. According to the invention, an automated matching tool may apply user input expressed semantically to a database of semantic information associated with syntactic information, to match the user input with a service (e.g., an application program) capable of performing a business process step corresponding to the input.

24 Claims, 6 Drawing Sheets

SYSTEM AND METHOD FOR BUSINESS PROCESS INTEGRATION

This application claims the benefit under 35 USC 119(e) of U.S. provisional application 60/660,337, filed Mar. 11, 2005 and fully incorporated herein by reference

BACKGROUND OF THE INVENTION

Business processes are subject to frequent changes. The changes may be due to such factors, for example, as a shift in business objectives, process streamlining, company acquisition, or acquiring new customers. Modifying an existing business process or developing a new business process to accommodate changes is often a complex task. Usually, business processes are heavily dependent on computer software for their implementation. Thus, modifying an existing business process or creating a new one typically requires the involvement of people with two distinct kinds of knowledge: people with knowledge about technology and software, and people with knowledge about business. In the typical course of things, a "business process expert" puts forward a set of business requirements, and a "technology expert" modifies or develops software and associated technologies to meet the requirements.

However, because each of the above actors is skilled in a different domain, each faces difficulties in fully supporting the other's role. For example, the business process expert is usually not familiar with technology and thus may give inadequate guidance to the technology expert. Similarly, the technology expert often has an inadequate understanding of the business side of things. This mutual lack of understanding may lead to, for example, wasted effort or an unsuitable technical implementation. The latter in turn can lead to, among other things, an unnecessarily extended business process development cycle, and the costs, such as lost revenue and unhappy customers, associated with this.

Software tools, sometimes called "process modeling" tools, are known for assisting in the development of business processes. However, such tools typically require a process modeler to know what "services" (e.g., computer software) are available to implement the process, and to generate code to call the services if available. Often, testing the new process (e.g. by simulation) can only be done once this coding is done. Thus, known process modeling tools can increase costs and extend the business process development cycle.

DETAILED DESCRIPTION

Embodiments of the present invention address the concerns noted above. The embodiments relate to an automated way for a non-technical person to create or modify software functionality in support of a business process without needing expertise in software. According to the invention, a database of semantic information associated with syntactic information may be built. The semantic information may include a representation of functionality associated with business processes in a form of expression (for example, natural language words, phrases and keywords) which is more easily understood by a non-technical person than, say, the formal syntax of a programming language. The syntactic information may contain technical specifics about services available in a given computer system platform to perform steps of a business process. A "service" as used herein refers to software, such as an application program or portion thereof, or a suite or collection of programs. The semantic information allows a person knowledgeable about a business process, but not necessarily about computer programming or about the services available in a given computer system, to design or modify a business process in natural, semantic terms found in the semantic information. An automated matching tool, using the database of semantic information associated with syntactic information, may do the work of pairing a user input expressed semantically with a service or services capable of performing a process step corresponding to the input. In particular, the matching tool may return actual runtime instances of the services available in the platform, making it possible, in contrast with known process modeling tools, to go substantially directly from modeling the process to executing the process in a real sense. Thus, embodiments of the present invention provide a business process integration system that is easy to use and that can shorten the process implementation cycle.

Figure 1:
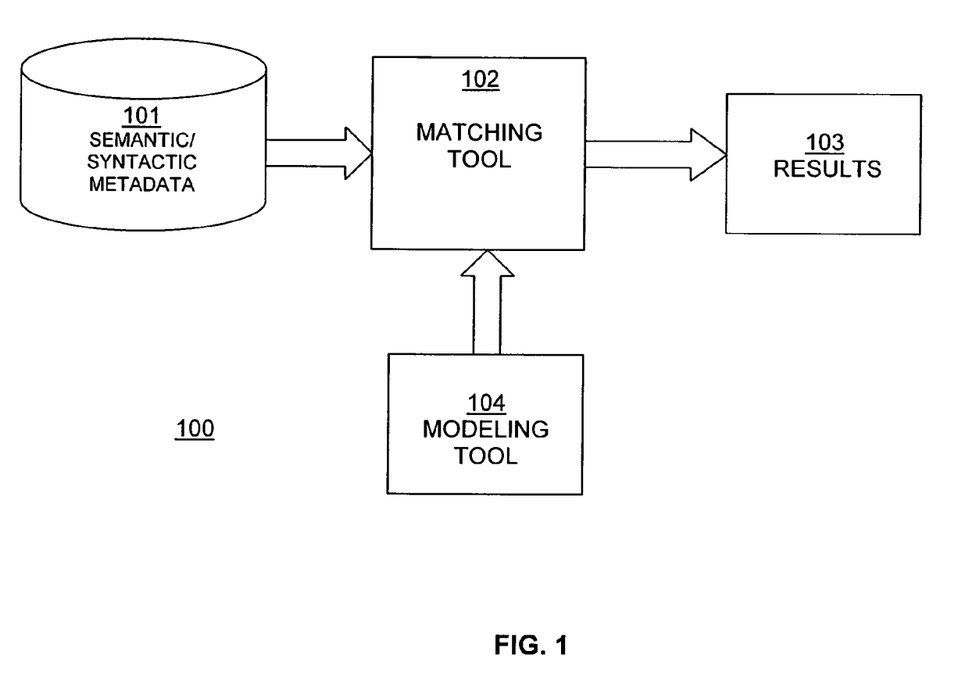
FIG. 1 shows components of a business integration system according to embodiments of the present invention.

FIG. 1 shows a high-level view of a business process integration system 100 according to embodiments of the invention. A business process integration system 100 according to the invention may comprise semantic/syntactic metadata 101, and a modeling tool 104 for use by a person (e.g. a "business process expert") to create or modify a business process. The business process expert may enter inputs, by way of the modeling tool 104, pursuant to the creation or modification of the business process. The modeling tool 104 may provide guidance to a user, for example by presenting semantic data to a user and allowing the user to make selections from the presented data. Using the associations formed between semantic and syntactic information in the semantic/syntactic metadata 101, a matching tool 102 may match user information entered via the modeling tool 104 with services able to perform steps of the business process.

More specifically, via the modeling tool 104, the business process expert may specify for the matching tool 102 in semantic terms what he or she wants a business process step to do. Based on the inputs of the business process expert, the matching tool 102 may perform a search of the semantic/syntactic persistent metadata 101, comparing the user inputs to data in the semantic/syntactic metadata 101 to produce results 103. The results 103 may include a list of best-fit services, a process step gap analysis (e.g., an identification of where there are no available services or available services are insufficient), and a ranking of services, in case there are multiple matches, in terms of suitability for a process step. The matching tool may make recommendations to the user based on the results. The user may select one or more services from the results.

Figure 2:
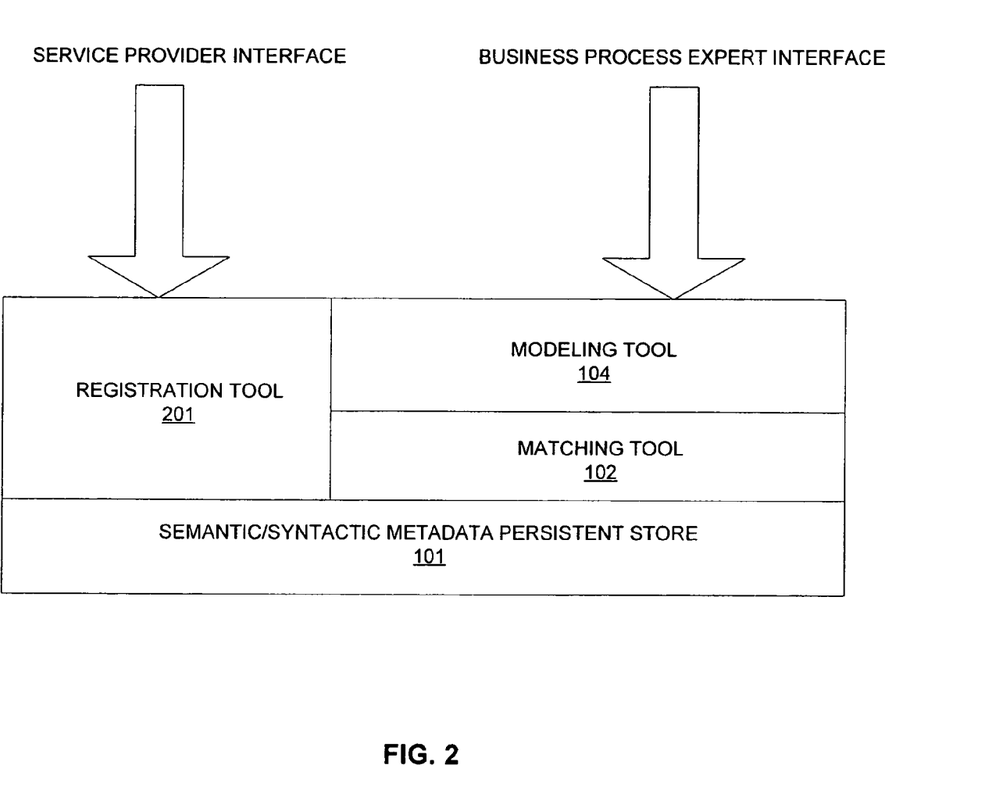
FIG. 2 shows a registration tool according to embodiments of the present invention.

Referring to FIG. 2, embodiments of the present invention may further comprise a registration tool 201. The registration tool 201 may be used to collect information to build the semantic/syntactic metadata 101 and store it in a persistent store. "Persistent store" as used here means in a medium, such as disk storage, where data can be stored for an indefinite period.

FIG. 2 further illustrates respective roles of potential users. One kind of user may be a person knowledgeable about service technology. For example, a service provider, such as a code developer, creates or modifies services and thus knows the technical particulars of the services. Other examples of persons having a good understanding of technical aspects of services include system librarians, system architects and system analysts. Such persons or other persons with technical knowledge may enter syntactic information about a service via an interface (e.g. a graphical user interface or GUI) of the registration tool, along with semantic terms, such as keywords, descriptive of the service. The semantic information may be associated with the syntactic information, for example by way of a keyword in a record in the semantic information that identifies a record in the syntactic information. Both the semantic and the syntactic information may be stored in the semantic/syntactic metadata persistent store 101.

Persons on the business side of things, by contrast, may not understand the technology used to realize functionality in a business process, but may know the business problem domain very well. Via an interface (e.g. a GUI) to the modeling tool 104 as described, such "business process experts" may access the information stored in the semantic/syntactic metadata persistent store 101 via the modeling tool 104 to create or modify a business process.

While FIG. 2 suggests a manual process, the semantic/syntactic metadata 101 may be built up by any of a variety of methods. The registration process could be partly or wholly automated. In an automated registration process, extraction programs could be applied to base or "raw" data sources to extract pertinent information. Such raw data sources could include user-written documentation describing service interfaces, for example. The service interface documentation may include, for example, information describing and/or defining operations of a service, input and output parameter types of the service, and data types of the service. The extraction programs could parse such documentation, and could further parse pseudo-code and/or source code, or other information sources, to derive and store syntactic information for each available service, as well as any semantic information available in the raw data. Text and natural language parsing tools are known that could be applied for this purpose. Semantic or syntactic information obtained via an automated process could be supplemented by manually entered semantic or syntactic information. The semantic information could then be annotated to, i.e., cross-referenced or otherwise associated with the appropriate syntactic information and stored in the semantic/syntactic metadata persistent store 101.

In another mechanism for building the semantic/syntactic metadata persistent store 101, the information therein could be automatically updated based on ongoing usage of the business process integration system 100. For example, from results 103 a business process expert might select a service to implement a process step in a "high-tech" industry. The selected service might have previously only been associated in the semantic/syntactic metadata with processes in, say, the health industry. Based on the process expert's choice of this service, a new association may be automatically formed in the semantic/syntactic metadata persistent store 101 between the service and new semantic metadata descriptive of a business process step in the high-tech industry. Subsequent applications of the modeling and matching tools may then include the service in the results, based on semantic user inputs matching the newly added semantic data. Thus, embodiments of the present invention may perform ongoing learning of new semantic metadata with respect to the syntactic metadata.

Figure 3:
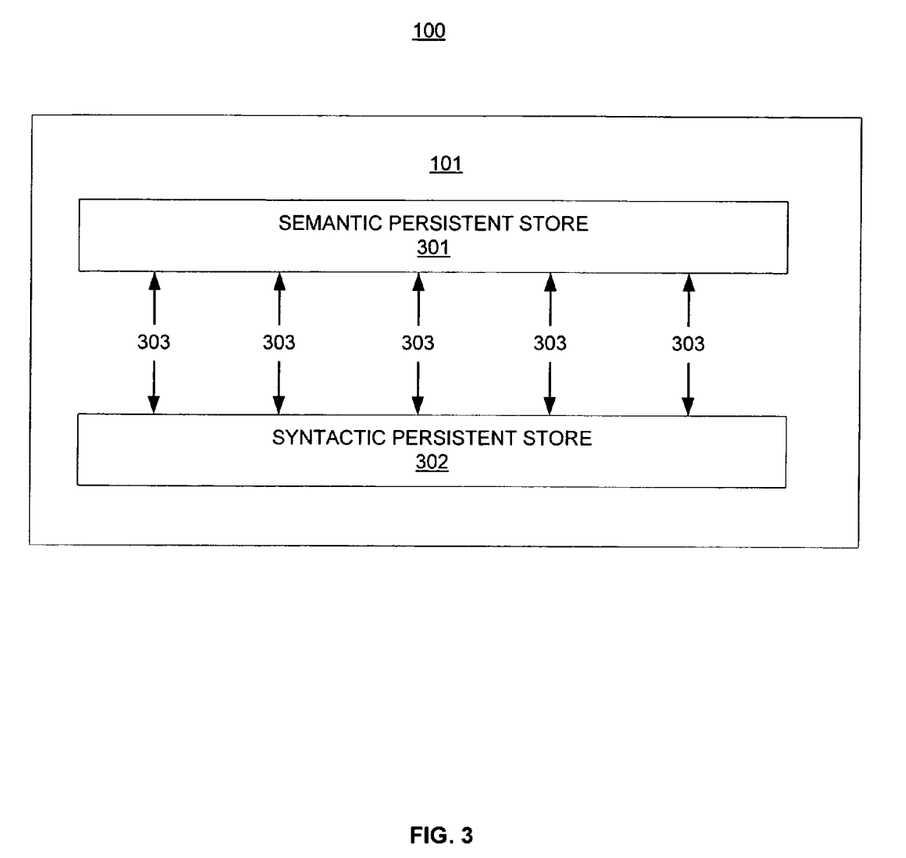
FIG. 3 shows semantic metadata and syntactic metadata, and associations therebetween, according to embodiments of the present invention.

As noted earlier, semantic information is associated with syntactic information in the semantic/syntactic metadata persistent store 101. As illustrated in FIG. 3, the semantic/syntactic metadata persistent store 101 may be viewed as comprising a semantic component, semantic persistent store 301, and a syntactic component, syntactic persistent store 302. There may be associations 303 (not limited to any particular number) between the semantic persistent store 301 and the syntactic persistent store 302.

Semantic Persistent Store

The semantic persistent store 301 may comprise three kinds of semantic metadata: functionality metadata, service metadata, and instance descriptor metadata. Any of the three kinds of semantic data may be searched independently of the other two for matches with user input. In this connection, it should be understood that the functionality metadata, service metadata, and instance descriptor metadata do not necessarily overlap at all points. That is, each may contain information not present in the others. Each of the functionality metadata, service metadata, and instance descriptor metadata is described in more detail below.

Functionality Metadata

A subset of the semantic persistent store 301 may include functionality metadata. An example of functionality metadata is given below. It should be understood that the example below, and other examples of metadata herein, are given only for purposes of illustrating principles of the present invention and the invention is in no way limited to the specific implementations described.

EXAMPLE 1

```
<FunctionalityInformation>
    <Record metadata="SAP - CRM">
        <Syntax id="Save Invoice" productType="SAP 4.6C">
        </Record>
    </Record>
    <Record metadata="SAP - FI">
        <Record metadata="Financial Accounting">
            <Record metadata="Bank Accounting">
                <Syntax id="Credit Card Settlement"
                productType="SAP4.6C"/>
                <Syntax id="Credit Card Settlement"
                productType="SAP 6.40"/>
            </Record>
            <Record metadata="General Ledger Accounting">
                <Syntax id="Calculate Taxes Doc"
                productType="SAP4.6C"/>
                <Syntax id="Update Taxes Doc"
                productType="SAP 6.40"/>
            </Record>
        </Record>
    </Record>
</FunctionalityInformation>
```

The functionality metadata may provide a semantic context for a service look-up, at various levels of specificity which may be hierarchically arranged. In the above example, "SAP-FI" is high-level context information representing a general category of services ("FInancial" services). Under this general category there are two, more specific categories, "Bank Accounting" and "General Ledger Accounting." Each of these has associated with it a syntax identifier (the value assigned to the keyword "Syntax id") which cross-references a corresponding syntactic information record in the syntactic information persistent store. The semantic term "Credit Card Settlement", in particular, assigned to "Syntax id" points to a syntactic record as illustrated in Example 6, discussed further on. Thus, the value of the keyword "Syntax id" is an example of an association 303 between the semantic metadata 301 and the syntactic metadata 302. The mnemonic "productType" identifies a version of a software release and links the functionality metadata to the instance descriptor metadata as described in more detail below.

Service Metadata

Another subset of the semantic persistent store 301 may include service metadata. Where the functionality metadata may function as a relatively coarse, contextual mapping to the syntactic metadata, the service metadata may act as a more granular mapping to the syntactic metadata. An example of service metadata is given below.

EXAMPLE 2

```
<ServiceInformation>
   <Record name="Calculate Taxes Doc" productType="SAP 4.6C">
      <Params>
         <Param name="CURRENCY">Currency Key</Param>
         <Param name="DIVISION">Business Area</Param>
      </Params>
   <Record>
   <Record name="Update Taxes Doc" productType="SAP 4.6C">
      <Params>
         <Param name="CURRENCY">Currency Key</Param>
      </Params>
      <PreConditions>
         <Precondition>Accounting G/L Posting</PreCondition>
      </PreConditions>
      <PostConditions>
         <Postcondition>...</PostCondition>
      </PostConditions>
   <Record>
   <Record name="Credit Card Settlement" productType="SAP 4.6C">
      <Params>
         <Param name="CCNUM">Card Number</Param>
         <Param name="CCINS">Card Type</Param>
      </Params>
   <Record>
```

Services are often interdependent and need to communicate with each other, i.e., call each other and pass each other parameters and data. The service metadata may comprise technical specifics relating to such interdependence and communication. For example, in an object-oriented implementation of a service, the service metadata may define operations available in an interface of the service that can be called by another service. In the above example, "Update Taxes Doc" and "Calculate Taxes Doc" represent such operations. The operations are callable by other services. The service metadata may further include, for example, parameter descriptions and dependencies among services. In the above example, the semantic term "Currency Key" in the service metadata corresponds to the specific parameter name "CURRENCY" in the "Update Taxes Doc" and "Calculate Taxes Doc" operations The dependency information in the service metadata may include preconditions and post-conditions. The above example shows a precondition wherein an "Accounting G/L Posting" operation must run before the "Update Taxes Doc" operation. The post-conditions may define what service(s) are likely to follow the completion of a given service.

The lines "<Record name='Calculate Taxes Doc' productType='SAP 4.6C'>" (line 2) and "<Record name='Credit Card Settlement' productType='SAP 4.6C>" (line 19) in the above are further examples of associations 303. That is, "Calculate Taxes Doc" and "Credit Card Settlement" are both semantic pointers to corresponding records in the syntactic persistent store 302. The semantic term "Credit Card Settlement", in particular, points to a syntactic record as illustrated in Example 6, discussed further on. Because of the more granular mapping between the service metadata and the syntactic metadata, matches therebetween could also be found based on more "technical" terms such as parameter names, e.g. "CCNUM" (line 21).

Instance Descriptor Metadata

An instance descriptor cross-references the functionality metadata with runtime instances of a service. A runtime instance is a specific version and configuration of executable code corresponding to a service. For example, a company could have a general human resources (HR) application, but need to configure the application differently for respective different geographical regions, due to regional laws. Or, for example, the HR application could be a newer version of the general HR application, for use in a newly acquired subsidiary. Each of the foregoing situations could call for a separate and distinct runtime instance of the general HR application.

An instance descriptor may include (I) a runtime descriptor, (II) an application (i.e., a service) framework descriptor, and (III) an application data transform descriptor.

I. Runtime Descriptor

A runtime descriptor may store an association or linkage between functionality metadata and a runtime instance. An example is shown below.

EXAMPLE 3

```
<RuntimeInformation>
   <Record metadata="General Ledger Accounting"
   dataStore="G/L Accounts>
      <Instance productType="SAP 4.6C">Eastern Region
      Instance</Instance>
      <Instance productType="SAP 6.40">Western Region
      Instance</Instance>
   </Record>
```

In the above, "General Ledger Accounting" is contextual functionality metadata that maps, for example, to the corresponding metadata of Example 1 (line 12). Similarly, "Instance productType='SAP 4.6C'" and "Instance productType='SAP 6.40'" map to "productType='SAP4.6C'" and "productType='SAP 6.40'" in Example 1 (lines 13 and 14). Thus, a search of the semantic metadata by the matching tool that matched the semantic input "General Ledger Accounting" in the functionality metadata could return the specific service runtime instances "Eastern Region Instance" and "Western Region Instance" of Example 3, above, based on the respective matching "productType" values in lines 13 and 14 of Example 1.

As described in more detail further on, a user may select matching services from results 103, where the services were matched in the syntactic metadata and returned in the results 103 based on associations with the functionality metadata. The selected services may then be matched with runtime instances thereof, based on associations between the functionality metadata and runtime descriptors (e.g., an association such as "General Ledger Accounting" and "Instance productType='SAP 4.6C'" as mentioned above).

However, as noted earlier, the instance descriptor metadata does not overlap everywhere with the functionality metadata. Thus, there could be runtime descriptors that are not cross-referenced with functionality metadata. Runtime descriptors of this kind could be matched directly with user inputs and returned in results 103. Runtime instances identified in this way could, for example, be used to perform a more sophisticated ranking of search results.

II. Application Framework Descriptor

An application framework descriptor may provide platform and communication protocol information. An example is shown below.

EXAMPLE 4

```
<Application name="Credit Card Settlement">
    <Release version="6.40">
        <Protocols>
            <Protocol>SAP RFC</Protocol>
            <Protocol>SOAP</Protocol>
        <Protocols>
        <Platform>SAP NetWeaver</Platform>
    </Release>
</Application>
```

The above indicates that the service "Credit Card Settlement" can execute on the service platform "SAP Netweaver," and can communicate in either of the "SAP RFC" or "SOAP" protocols.

III. Application Data Transform Descriptor

An application data transform descriptor may store information relating to a transform of data between applications (services). An example is shown below.

EXAMPLE 5

```
<ApplicationDataTransform>
    <Record from="SAP - FI" to "SAP - FI">
        <FromAppRelease>6.40</FromAppRelease>
        <ToAppRelease>4.6C<ToAppRelease>
        <AdapterInstance>SAP Adapter</AdapterInstance>
    </Record>
</ApplicationDataTransform>
```

The above application data transform descriptor identifies an instance of an adapter "/AdapterInstance" able to convert data from a new release of SAP-FI (release 6.40) to an older release (release 4.6C). More generally, data between different applications or different versions of the same application may not be compatible. The adapters specify the instance of the code that understands the data format and meaning between a pair of applications. The adapters may include transactions.

Syntactic Persistent Store

The syntactic persistent store 302 may store the syntactic information of services. The syntactic information may include operations, parameters and data types of the services. An example is shown below.

EXAMPLE 6

```
<SyntacticInformation>
    <Record name="Credit Card Settlement" productType="SAP 4.6C">
        <Operation name="CREDIT_CARD_SETTLEMENT">
            <OpParameter name="CCNUM">
                <SimpleDataType>CHAR25</SimpleDataType>
                <ParamRequired>true</ParamRequired>
            </OpParameter>
            <OpParameter name="CCINS">
                <SimpleDataType>CHAR 4</SimpleDataType>
                <Param Required>true<ParamRequired>
            </OpParameter>
        </Operation>
    </Record>
    <Record name="Credit Card Settlement" productType="SAP 6.40">
```

In the above, "Credit Card Settlement" is a syntactic information record identifier. This identifier may be one point of linkage between the semantic metadata and the syntactic metadata, as described earlier in connection with Examples 1 and 2. Specifically, the semantic metadata may be cross-referenced or associated with the syntactic metadata via this unique identifier. Referring to Example 1, the line "Syntax id='Credit Card Settlement' productType='SAP4.6C'/", for example, is an association with the syntactic metadata of Example 6. More specifically, based on a user entering or selecting the metadata "SAP-FI", "Financial Accounting", "Bank Accounting" and "Credit Card Settlement" (i.e., the hierarchy of metadata shown the 6th through 11th lines of Example 1) via the modeling tool 104, the matching tool 102 may find the service whose particulars are specified in Example 6, and return this service in results 103. In Example 6, the actual service is the value assigned to "Operation name", that is, "CREDIT_CARD_SETTLEMENT".

Similarly, a match between user inputs and service metadata (Example 2) could yield a corresponding syntactic information record, based on an association between the service metadata and the syntactic information record. As mentioned earlier, the service metadata more closely parallels the technical information of the syntactic metadata than does the functionality metadata, to capture semantic meaning that is closer to what the technically skilled user understands. This allows, for example, a technically skilled user to search on a term such as the parameter name "CCNUM", and via this more "technical" term, find a matching syntactic record.

Matching Tool

As discussed above, the matching tool 102 applies user inputs to the semantic/syntactic persistent store 101 to find matching services. More specifically, the matching tool 102 may perform a search of the semantic/syntactic persistent store 101 to compare the user inputs to data in the semantic/syntactic persistent store.

The matching tool may search the functionality metadata and the service metadata separately, and group and rank the results for each search. For a search of the functionality metadata, the tool may form a compound search term from user inputs and look for matches in the functionality metadata. For example, as discussed above, the compound search term "SAP-FI/Financial Accounting/Bank Accounting/Credit Card Settlement/" would be a match with Example 1, which in turn points to the syntactic information record of Example 6 identifying the service "CREDIT_CARD_SETTLEMENT".

Similarly, for a search of the service metadata, the matching tool may apply user semantic inputs to look for matches. For example, based on the user input "Credit Card Settlement" and/or "CCNUM", the matching tool may find matching information in the service metadata of Example 2, which includes the line "<Record name='Credit Card Settlement' productType='SAP 4.6C'>" (line 19) and "<Param name='CCNUM'>Card Number</Param>" (line 21). These in turn point to the syntactic information record of Example 6 identifying the service "CREDIT_CARD_SETTLEMENT".

Results of the search in the functionality metadata and the service metadata may be merged. For example, if there are common syntactic information record identifiers in the respective results, the number of these may be summed. Otherwise, the results may be kept separate and distinct. The results may be sorted and ranked, for example based on the number of matches per service. However, the ranking of the results need not be limited to ranking based on the number of matches. Any criteria could be established as a basis for assigning a rank to a match, and corresponding logic applied to assign the rank. The ranking logic could, for example, include an evaluation of the runtime instances returned via direct matches with user inputs in the instance descriptor metadata, as mentioned earlier. Results 103 presented to a user may include the user's original semantic data inputs, sorted and ranked results from the functionality and service metadata searches and corresponding matching syntactic information record identifiers. The user may be prompted to select one or more services.

The results 103 may further include an evaluation or analysis of gaps in the available services. For example, results may show that the matching tool did not find any matches, indicating that probably no suitable service exists in a given system platform. Or, there may be matches resulting from the service metadata search but not from the functionality metadata search. This implies that there are services having the right "service signature" (i.e., parameter names, release version and the like), but without having corresponding functionality metadata in the persistent store. On the other hand, there may be matches resulting from the functionality metadata search but not from the service metadata search. This implies that there are available services in the right semantic context, but without corresponding matching service signatures.

As noted earlier, embodiments of the invention may perform ongoing learning. In particular, this may be done in connection with the analysis of gaps in the results as mentioned above. For example, if a user selects a service from the service metadata matches when there is no corresponding functionality metadata match, the user may be prompted to enter new semantic metadata for adding to the functionality metadata in the persistent store. An association may be automatically formed between the newly added functionality metadata and the syntactic metadata corresponding to the selected service. Alternatively to prompting the user for new semantic metadata, the user's original semantic inputs via the modeling tool could be automatically used to update the functionality metadata.

In the event that there are matches from the search of the functionality metadata, but no corresponding matches from the service metadata search, a user might select a service or services from the functionality metadata matches, and be prompted for service data transformations, as discussed in more detail further on.

Runtime descriptors (see Example 3) may be used to find actual runtime instances of selected services. To this end, functionality metadata of selected services may be compared against runtime descriptors to find matches. As there may be multiple matches, user input to select a particular runtime instance may be requested.

For selected runtime instances, application framework descriptors (see Example 4) may be looked up. This may be done, in particular, in connection with runtime instances corresponding to successive process steps. When runtime instances of successive process steps are different, there may be a need to determine a communication protocol usable for communication between the two runtime instances. This may be done by looking up the protocol in the application framework descriptors. Further, application data transform descriptors (see Example 5) may be looked up to handle any data-value mapping or transactions needed between the successive process steps. A platform orchestration tool according to embodiments of the invention may generate calling stubs between process steps and apply data-value mapping between runtime instances.

Figure 4A:
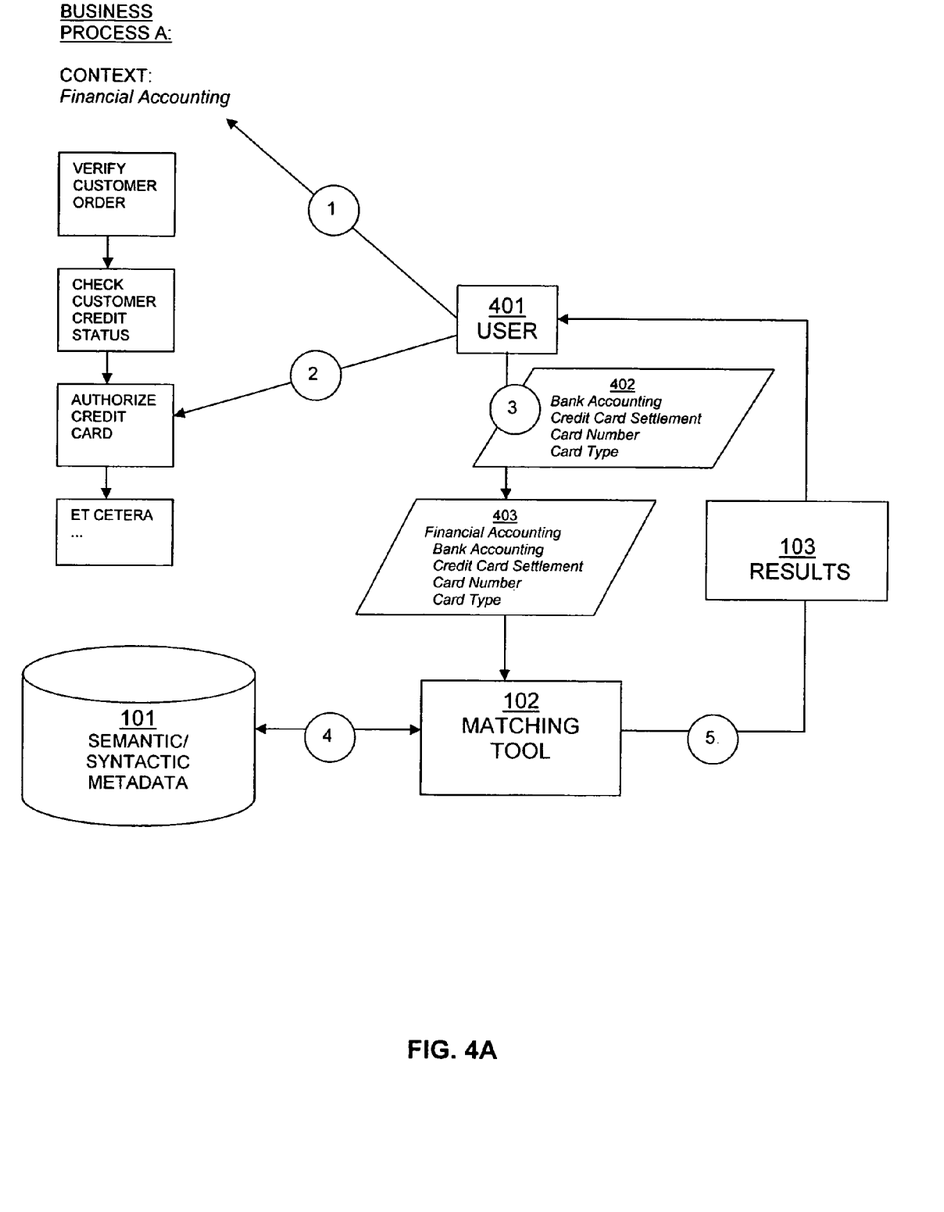
FIGS. 4A and 4B show a process flow according to embodiments of the present invention.
Figure 4B:
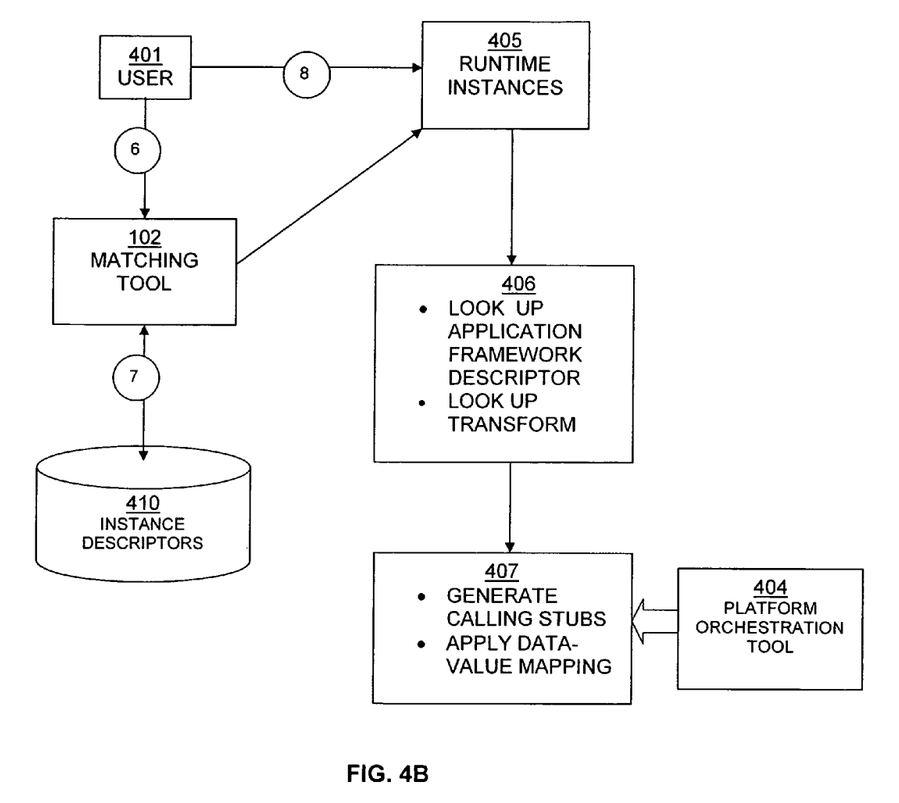

FIGS. 4A and 4B illustrate a process according to embodiments of the invention. Referring to FIG. 4A, assume that a user 401, for example a business process expert, is designing or modifying a business process, "Business Process A". Business Process A comprises process steps "Verify Customer Order", "Check Customer Credit Status", and "Authorize Credit Card". Further assume that the user 401 has already created/modified the "Verify Customer Order" and "Check Customer Credit Status" steps, or that these steps have already been created/modified, and that the user is on the point of creating/modifying the "Authorize Credit Card" process step, using the modeling tool 104. The modeling tool 104 may guide a user by presentation of semantic information (metadata) and prompting for semantic information. Thus, for example, the modeling tool 104 may present the user with the option of selecting, or prompt the user to enter, a semantic context for the process step. The user (1) specifies "Financial Accounting" in response.

Next, the user (2) tells the modeling tool that he/she wants to create/modify an "Authorize Credit Card" process step, and (3) provides the semantic information "Bank Accounting/Credit Card Settlement/Card Number/Card Type" 402.

The context and process step semantics 402 may be combined into a compound semantic search argument 403, and input to the matching tool 102. The matching tool (4) may apply the semantic search argument 403 to the semantic/syntactic metadata 101. If a match for the semantic search argument 403 is found in the semantic component (semantic persistent store 301) of the metadata 101, the syntactic component (syntactic persistent store 302) cross-referenced to the matching semantic components may be referenced to determine what service or services correspond to the syntactic component. The matching service or services may then (4)/(5) be returned to the user 401 for inspection in results 103. The results 103 may include a ranked list of best-fit services.

Referring to FIG. 4B, the user may be prompted to (6) select one or more services from the list. By searching instance descriptors 410, a selected service may further (7) be matched with one or more runtime instances 405 thereof. The user 401 may be prompted to (8) select a matching runtime instance. For a selected runtime instance, a matching application framework descriptor may be looked up (block 406). If the application framework descriptor indicates that the selected runtime instance uses a different communication protocol from the runtime instance of the previous process step ("Check Customer Credit Status"), application data transform descriptors may be searched to find a suitable transform (block 406) to handle any data-value mapping or transactions needed between the selected runtime instance and the runtime instance of the previous process step. As noted previously, a platform orchestration tool 404 may generate calling stubs between process steps and apply data-value mapping between runtime instances (block 407). More specifically, the platform orchestration tool could insert an adapter instance such as "SAP Adapter" (see Example 5) between the runtime instances, linking the adapter instance and the runtime instances by calling stubs. The adapter instance could map data fields in one runtime instance to the other.

An output of the above-described operations may be a "process model" or "process representation" comprising a sequence of executable runtime instances, possibly with adapters inserted therebetween, able to be put directly into effect to implement a business process, in contrast to known modeling tools.

It should further be understood that the above example discussed with reference to FIGS. 4A and 4B shows a path wherein runtime instances are matched with services selected from results 103. However, as discussed earlier, user inputs could be matched directly with runtime descriptors by independently applying the user inputs to the instance descriptor metadata. This direct matching could be performed substantially in parallel with the process shown in FIG. 4A to return matching runtime instances as well as matching services in results 103.

Figure 5:
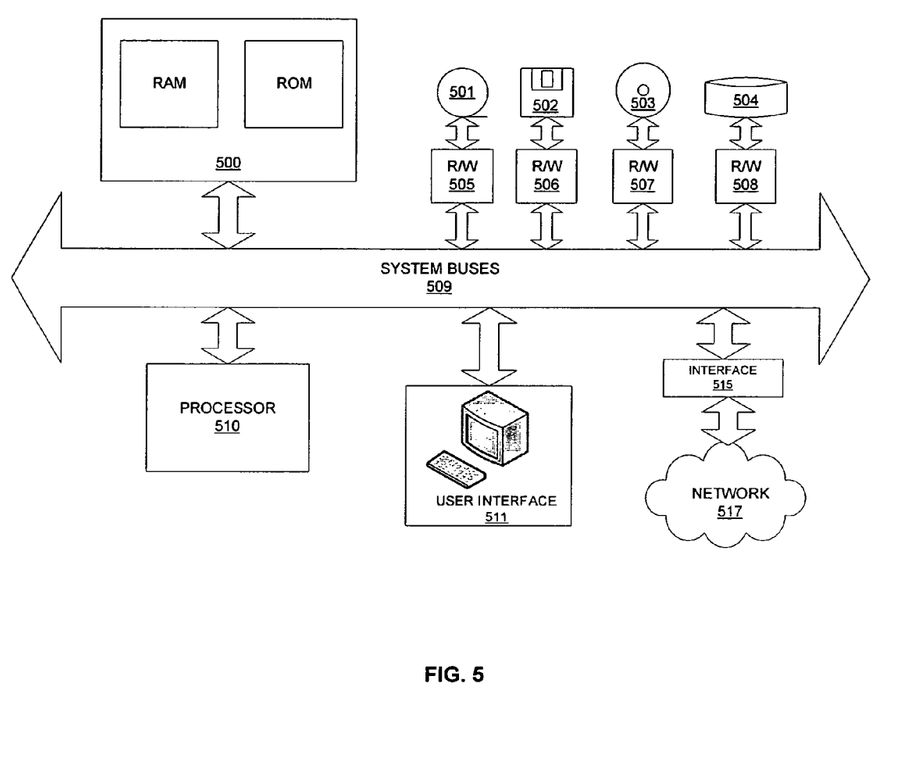
FIG. 5 illustrates a generic computer system suitable for implementing embodiments of the present invention.

FIG. 5 shows a high-level representation of a computer hardware platform for implementing (e.g., coding and executing) embodiments of the present invention, such as might be realized by a variety of known and commercially available hardware and software elements. The system may comprise a memory 500 including ROM and RAM, processor 510 and user interface 511 comprising a display device and a keyboard for data entry, for example. Elements may communicate via system buses 509. The system may further comprise a network 517 connected by a network medium and network interface 515.

A computer program or collection of programs comprising computer-executable instructions according to embodiments of the present invention may be stored and transported on machine-readable media such as magnetic tape 501, floppy disk 502, CD-ROM 503 and fixed disk 504. The computer instructions may be retrieved from the machine-readable media 501-504 using a suitable reading device 505-508 into memory 500, and executed by a processor 510. The computer-executable instructions may be distributed across a plurality of media, such as on physically separate storage devices respectively associated with physically separate computer systems that may communicate via the network 517. The functionality disclosed hereinabove for performing the embodiments may find specific implementations in a variety of forms, which are considered to be within the abilities of a programmer of ordinary skill in the art after having reviewed the specification.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. An automated method comprising:
storing, using a computer processor, semantic information in a database, the semantic information being related to steps of business processes and describing the steps of the business processes in natural language expressions, the semantic information including functionality metadata, service metadata and instance descriptor metadata, wherein the functionality metadata provides a semantic context containing various levels of specificity and arranged in a hierarchical structure, the service metadata includes technical aspects relating to services implemented in software applications, and the instance descriptor metadata contains data transformation information relating to a transform of data between software applications and cross-references between the functionality metadata and runtime instances of the services;
storing, using the computer processor, syntactic information for the services in the database, the syntactic information being cross-referenced to semantic information and related to the software applications each implementing a step of the business processes;
comparing, by the computer processor, user input relating to business process with the semantic information and syntactic information, and associations therebetween
on a match between the input and the semantic information, identifying, by the computer processor, corresponding syntactic information based on the associations; and
from the corresponding syntactic information, identifying, by the computer processor, a software application that implements the step of the business process specified in the user input;
identifying, by the computer processor, the data transformation information corresponding to the identified software application; and
generating, by the computer processor, an integrated sequence of runtime instances of identified software applications to implement the business process by repeating the above comparing, identifying corresponding syntactic information and identifying a software application steps, wherein each runtime instance in the sequence implements a respective step of the business process and communicates with adjacent runtime instances via adapters created based on the identified data transformation information.

2. The method of claim 1, further comprising presenting results including the identified software application to a user.

3. The method of claim 2, further comprising ranking a plurality of software applications included in the results.

4. The method of claim 2, further comprising prompting a user to select a software application from a plurality of software applications identified in the results.

5. The method of claim 2, further comprising automatically updating the semantic information when the results indicate an absence of a matching software application.

6. The method of claim 1, wherein the instance descriptor metadata further contains a runtime descriptor that stores an association between functionality metadata and a runtime instance.

7. The method of claim 1, wherein the instance descriptor metadata further contains an application framework descriptor that provides platform and communication protocol information.

8. The method of claim 1, wherein the syntactic information includes at least one of an operation, a parameter, or a data type of a service.

9. A machine-readable medium storing program instructions that, when executed by a computer, cause the computer to perform steps comprising:

storing, using a computer processor, semantic information in a database, the semantic information being related to steps of business processes and describing the steps of the business processes in natural language expressions, the semantic information including functionality metadata, service metadata and instance descriptor metadata, wherein the functionality metadata provides a semantic context containing various levels of specificity and arranged in a hierarchical structure, the service metadata includes technical aspects relating to services implemented in software, and the instance descriptor metadata contains data transformation information relating to a transform of data between software applications and cross-references between the functionality metadata and runtime instances of the services;

storing in the database, using the computer processor, syntactic information for the services, the syntactic information being cross-referenced to semantic information and related to the services software applications each implementing a step of the business processes;

comparing user input relating to a business process with the semantic information and syntactic information, and associations therebetween;

on a match between the input and the semantic information, identifying corresponding syntactic information based on the associations;

from the corresponding syntactic information, identifying a software application that implements the step of the business process specified in the user input;

identifying the data transformation information corresponding to the identified software application; and generating an integrated sequence of runtime instances of identified software applications to implement the business process by repeating the above comparing, identifying corresponding syntactic information and identifying a software application steps, wherein each runtime instance in the sequence implements to a respective step of the business process and communicates with adjacent runtime instances via adapters created based on the identified data transformation information.

10. The machine-readable medium of claim 9, wherein the syntactic information includes at least one of an operation, a parameter, or a data type of a service.

11. The machine-readable medium of claim 9, wherein the instance descriptor metadata further contains a runtime descriptor that stores an association between functionality metadata and a runtime instance.

12. The machine-readable medium of claim 9, wherein the instance descriptor metadata further contains an application framework descriptor that provides platform and communication protocol information.

13. The machine-readable medium of claim 9, wherein the steps further comprises presenting results including the identified software application to a user.

14. The machine-readable medium of claim 13, wherein the steps further comprises ranking a plurality of software applications included in the results.

15. The machine-readable medium of claim 13, wherein the steps further comprises prompting a user to select a software application from a plurality of software applications identified in the results.

16. The machine-readable medium of claim 13, further comprising automatically updating the semantic information when the results indicate an absence of a matching software application.

17. A business process integration system comprising:

a semantic persistent store including semantic information relating to business processes, the semantic information describing business processes and steps of the business processes in natural language expressions, the semantic information including functionality metadata, service metadata and instance descriptor metadata, wherein the functionality metadata provides a semantic context containing various levels of specificity and arranged in a hierarchical structure, the service metadata includes technical aspects relating to services implemented in software, and the instance descriptor metadata contains data transformation information relating to a transform of data between software applications and cross-references between the functionality metadata and runtime instances of the services;

a syntactic persistent store including syntactic information, the syntactic information being cross-referenced to semantic information and relating to software applications each implementing a step of the business processes;

a modeling tool to receive user inputs related to creating or modifying steps for a business process;

a matching tool to search the semantic persistent store and the syntactic persistent store for software applications to match the user inputs, the matching tool to identify the data transformation information corresponding to matched software applications and to generate an integrated sequence of runtime instances of matched software applications to implement the business process specified by semantic terms of the user inputs, wherein each runtime instance in the sequence implements a respective step of the business process and communicates with adjacent runtime instances via adapters created based on the identified data transformation information; and a memory and a processor to respectively store and execute instructions to implement the modeling tool and the matching tool.

18. The business process integration system of claim 17, wherein the syntactic information includes at least one of an operation, a parameter, or a data type of a service.

19. The business process integration system of claim 17, wherein the matching tool is to further present results including the identified software application to a user.

20. The business process integration system of claim 19, wherein the matching tool is to further rank a plurality of software applications included in the results.

21. The business process integration system of claim 19, wherein the matching tool is to further prompt a user to select a software application from a plurality of software applications identified in the results.

22. The business process integration system of claim 19, wherein the matching tool is to further automatically update the semantic information when the results indicate an absence of a matching software application.

23. The business process integration system of claim 17, wherein the instance descriptor metadata further contains a runtime descriptor that stores an association between functionality metadata and a runtime instance.

24. The business process integration system of claim 17, wherein the instance descriptor metadata further contains an application framework descriptor that provides platform and communication protocol information.

* * * * *